United States Patent Office 3,113,924
Patented Dec. 10, 1963

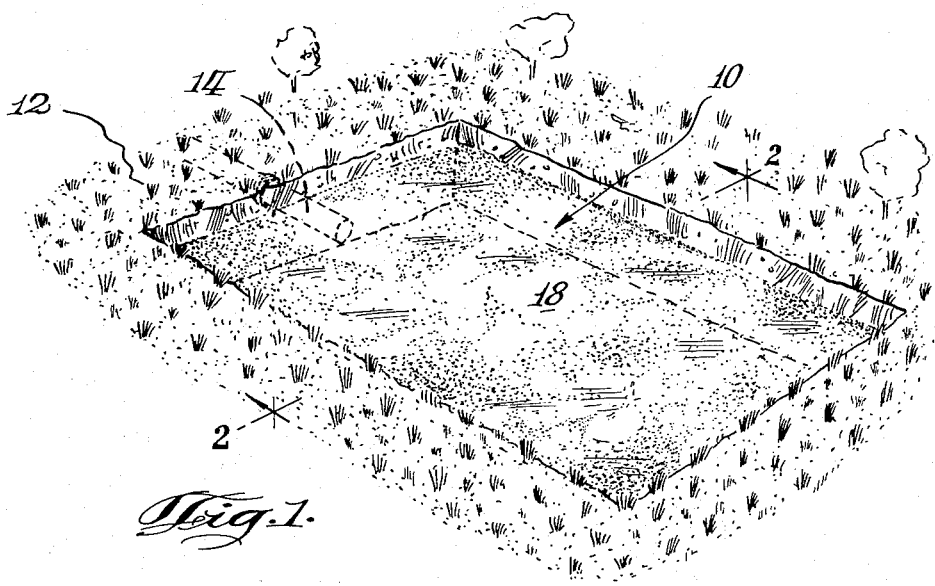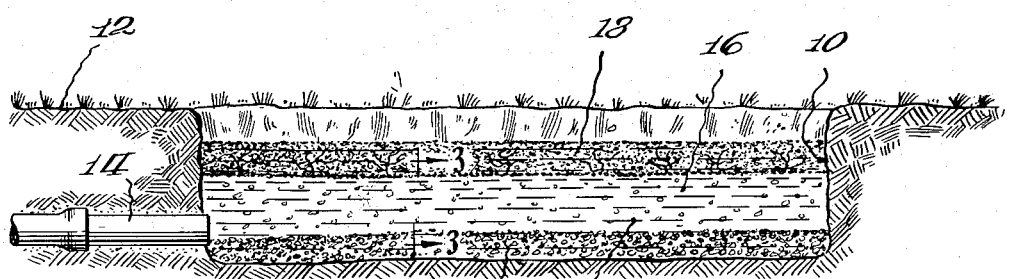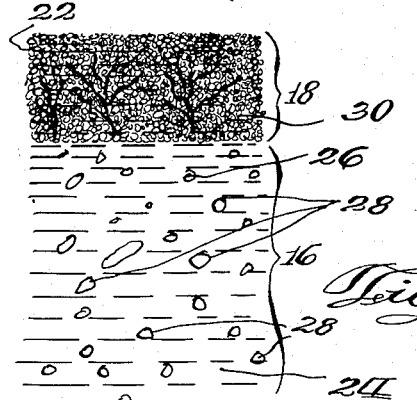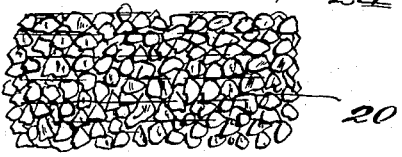

3,113,924
PROCESS FOR MATERIAL ABATEMENT OF ODOR ARISING FROM SEWAGE EFFLUENT
Carl Mendius, Jr., Naperville, Ill., assignor to Silbrico Corporation, Chicago, Ill., a corporation of Illinois
Filed Sept. 12, 1960, Ser. No. 55,395
7 Claims. (Cl. 210—63)

This invention relates generally to the treatment of sewage effluents and more particularly, concerns a process for substantially eliminating the noxious odors characteristic of such effluents, said process being particularly effective for use in connection with cesspools and the like. The invention also contemplates the provision of structural means whereby the above process may be quite advantageously and practically carried out.

As used in the following specification and the claims appended thereto, the term "cesspool" is to be interpreted as encompassing all manner of structures utilized for the storage and treatment of effluents from the treatment of raw sewage. While commonly taking the form of shallow pits such as utilized in conjunction with septic tank effluents, the term is not intended to be limited solely to such type of shallow pit.

Sewage effluents are generally aqueous secondary products resulting from the chemical or biological treatment of raw sewage as occurs in large scale sewage disposal plants or on a smaller scale, in septic tanks and the like. Such effluents generally comprise dilute aqueous solutions and/or suspensions of undigested solid matter and carry a major portion of liquid waste products therein. Such solutions and/or suspensions must be allowed to complete the digestion cycle prior to being dissipated either for irrigation purposes, for recovery of water for industrial uses, and too, to protect public health and safety. A basic and commonly used method of treating such effluents is to run them into a shallow pit permitting natural aeration, evaporation, digestion and dissipation processes to occur in open air. Such a shallow pit or depressed field is typified by the common cesspool structure and same may be formed to collect and retain therein the "run-off" from a main sewage treatment plant such as a septic tank. Such effluents are introduced into the said cesspool generally by running a series of drain tiles in communication between the said cesspool and the septic tank.

As is obvious, the foremost disadvantage and most disagreeable aspect of the cesspool arrangement is the continuous and highly noxious odor originating therefrom. The control and reduction of such odors is mandatory. Not only are there minmium legal requirements of state and municipal authorities to prevent what are termed nuisances, but the health, comfort and well being of persons living and/or frequenting the vicinity thereof are endangered by the continued presence of such odoriferous formations.

Principally caused by the release of hydrogen sulfide gas during the digestion cycle, the aforementioned odors are penetrating and exceedingly distasteful. This invention is concerned with the reduction thereof below the tolerability level.

Several methods of treating such effluents in order to reduce the odor to a more tolerable level have been employed but same are ineffective and/or uneconomical. Treatments with activated sludge, activated charcoal or the like surface-active agents are only temporarily effective. Even such short lived effectiveness is achieved only at high cost. The activity of this type of agent decreases rapidly with time, and because of continuous replenishment of such effluents into the pool, the treatment requires substantial additional quantities of such agents be added repetitively and often. Several chemical methods of neutralizing the hydrogen sulfide gas have been used but are substantially ineffective due to the presence of other odoriferous compounds such as skatole, indole, etc., whose distasteful odors are masked by the hydrogen sulfide but which come to the foreground upon the elimination of said hydrogen sulfide. Thus such methods as chlorination, pre-aeration, etc. are expensive and in most cases ineffective in materially reducing the stench of said cesspools and the like.

Another chemical method commonly utilized involves the treatment of the effluent with lime, thus raising the pH thereof and reducing the hydrogen sulfide odor. However, then the "fishy" ammoniacal odors become prominent and are not too less tolerable.

Thus the major disadvantages of deodorizing treatments heretofore utilized upon effluents may be summarized as including: ineffectiveness, replacement of a masked odor by another disagreeable odor, prohibitive cost per treatment and the necessity for continuous application of treating material and processes and the relatively short effective life of each treatment.

Another further method of control, which may be suggested by the nature of the problem at hand, is to cap the cesspool in some manner such as by means of an impervious cover or the like in order to prevent any odor from escaping therefrom. Such possibility immediately faces three basic disadvantages. First, there is the necessity of exposure of the effluent to the air in order to allow for natural digestion thereof, for which air is required. Any capping structure known presently would seal off the pool to air in accomplishing the sealing off odor from escape. Secondly, any capping solution as presently known would be physically and economically unfeasible due to the large expanse of open area which of necessity would require covering.

The third major problem to be overcome would be the prevention of gaseous pressure buildup under the "cap." True, some type of pressure relief valve could be included in the capping structure; however, when relieved, the noxious odor would escape, and thus the whole purpose of the capping procedure would be frustrated.

Accordingly, it is the principal object of this invention to provide a method for materially abating the noxious odors of sewage effluent, found in cesspools and the like, said method comprising the covering said pool with a porous, wettable layer of granular floatable mineral material whereby the noxious gases arising from said effluent are converted to non-odoriferous products within the interstices of said granular layer, said layer preventing the escape of noxious odor arising from the main body of effluent yet also preventing the accumulation of any substantial gas pressure at the interface of said effluent and said layer. The term "floating" or "floatable" as is utilized herein includes instances of actual buoyancy and also instances wherein the amount of fluid present is insufficient to buoy the blanket but wherein some free fluid remains at the bottom of the pool.

Another object of the invention is to provide a method for substantially reducing the noxious odors of sewage effluent to below the tolerance level and which substantially eliminates the disadvantages encountered with prior methods as enumerated above; which is economical to use; which has application to both large scale treatment of effluent and the relatively small scale effluent from septic tanks and the like; and which is effective and lasting without continuous replenishment or reactivation of the treating agent.

A further object of this invention is to provide a method of treating sewage effluents in cesspools and the like whereby the noxious odor thereof is materially reduced to a tolerable level, said method comprising the introduction into said cesspool effluent of an expanded granular material, and flotation thereof over the surface of said effluent with the formation of a blanket of said material on the top thereof.

Still another object of the invention is the provision of a blanket for a cesspool or the like for materially abating the noxious odor thereof during the digestion of sewage effluent therein; said blanket being formed of a plurality of mats or bats formed of granules of intumesced or expanded vitreous mineral material generally of volcanic origin, and said mats are adapted to be floatably supported at the surface of said cesspool to entirely cover same, and each of the mats having a plurality of tortuous capillary paths therein and a substantial portion of said granules having a sealed intercellular structure.

Other objects and advantages of the invention will become apparent to the skilled artisan as a description of several examples of my invention ensues. In connection with said description, a general theoretical explanation will be proposed, said explanation being a reasonable one according to the knowledge and experience of the applicant. Such theoretical explanation as will be hereinafter proposed is only for the purpose of aiding in the understanding and practice of the invention. No limitation is intended by such theory since the invention as embodied in the process hereinafter described will succeed in producing the desired results irrespective of whether the theory is correct or not. Obviously many variations in the details of the novel process for odor abatement of sewage effluents may be made without departing from the spirit or scope of the invention as set forth in the appended claims.

In the drawing:

FIG. 1 is a perspective view of a cesspool having one embodiment of the invention practiced thereon.

FIG. 2 is an enlarged section taken along line 2—2 of FIG. 1.

FIG. 3 is an enlarged section taken along lines 3—3 of FIG. 2.

The invention herein generally comprises the treatment of effluent flowing from or out of sewage treatment basins or chambers with an intumesced granular mineral material for the purpose of abating and reducing the noxious odors characteristic of such effluent to a degree below the human tolerance level.

In particular, the invention contemplates the use of commonly found vitreous volcanic rocks having intumescent properties, and which minerals have been intumesced whereby sealed microscopic cells or chambers are formed therein upon the treatment thereof by heating such mineral particles to high temperatures, causing softening and vaporization of the water of crystallization therein forming said sealed cells as an intercellular structure. The resulting "honeycomb" structure formed upon exposure of said minerals to high heat contributes the following characteristics to said mineral: The intumesced mineral material is lightweight, has excellent thermal insulative properties, has a substantially increased active surface area, and is particularly characterized by the fact that it floats on water even though the surface thereof is completely wetted, and that it resists the absorption of water into the cellular structure. It is believed that the "sealed cell" structure of these granules may largely contribute to the above mentioned characteristics.

Such mineral when introduced into any aqueous solution will immediately rise to the surface and float for an indefinite time. Absorption of said water through the walls thereof is minimized by the vitreous nature of said walls; however, because the surface exterior wall surface of said intumesced material is immediately wet the forces of adhesion between separate expanded particles remain strong so that the floating mass is held together rather than allowed to float about in groups or clusters. Thus the result which is similar in appearance to the action of soured cream in hot liquid is avoided.

The invention contemplates the treatment of effluent by running same into shallow pits 10 or depressed areas set into a field 12 commonly known as cesspools designated by reference character 10 shown in FIG. 1, wherein the said effluent 16 is permitted to complete the biological digestion process in the presence of air. The bottom of the cesspool may be lined with rock aggregate, pebbles or the like as shown at 20. Since the principal constituent or digestion product to which the noxious odor is attributed is hydrogen sulfide, the main task at hand is to reduce the concentration thereof whereby the characteristic odor is substantially minimized.

Exposure of such gases to the free oxygen of the air, such as in the process of aeration in the presence of water, is one chemical method of oxidizing the hydrogen sulfide gas to sulfurous acid, the latter being odorless. However, this method would not ordinarily eliminate the odor from the cesspool as such gas is constantly being released to the atmosphere prior to its being oxidized.

The method of the invention, however, provides for the formation of a blanket layer 18 of the material above described and floating same upon the surface of the effluent 10. The outer surfaces 22 of each of said particles in direct contact with the effluent are completely wet with a thin surface layer of water. Because the heavier digestible materials 24 would naturally tend to sink to the lower region of the pool, the upper surface water 26 thereof is substantially free from digestible matter. The granular material may be laid over the surface of the pool 10 simply by emptying bags thereof or shoveling same onto the pool surface or may be formed in mats or bats, groups thereof arranged so as to cover the pool. In a relatively short interval of time, by capillary action caused by the presence of what could be best described as a tortious air path through said blanket, all surfaces of said particles throughout the layer 18 thereof are soon completely wet.

As the hydrogen sulfide gas 28 is formed during the digestion cycle, it bubbles upwards toward the blanket. Upon meeting the resistance of the vitreous surface of the particles, the gas is deflected into the spaces 30 between said particles rather than being absorbed therethrough. Because of the relatively short distance between adjacent particles and the tortuous nature of the path through the blanket, the gas bubbles are dispersed into bubbles of extremely fine dimension. These fine hydrogen sulfide bubbles most probably enter into a reaction with oxygen in aqueous solution on the wet vitreous surfaces of said particles to result in the production of odorless sulfurous acid.

This process takes place in the interstices throughout the blanket formed by said floating particles, hence no appreciable amount of hydrogen sulfide gas is permitted to be released from said blanket. The thickness of the particle layer is chosen so as to adjust the length of time of passage of said gas bubbles therethrough to the rate of reaction of said gas thereby preventing any unreacted gas from escaping.

Perhaps another contributing factor to the successful odor abatement accomplished by application of the invention may be the highly insulative characteristic of the expanded rock material of the invention. In covering the cesspools with the blanket formed of expanded material, the effluent may be maintained at a temperature most advantageous to proper digestion thereof, said temperature being above freezing and preferably not below 40° F. Thus in areas of large expanse situated under cold or severe winter climatic conditions, the problem of freezing of the pool, cessation of digestion and maintenance of odor control during spring thaws heretofore quite acute is hereby substantially eliminated. Utilization of the invention permits continued natural digestion even if the climate is cold.

Two specific examples will be described wherein the method according to the invention was successfully utilized experimentally in connection with effluent from a septic tank, the latter being utilized as a sewage treatment basin for receiving and treating household wastes. In both examples, the effluent from said septic tank was run into a cesspool or shallow pit by means of a series of drain tiles shown at 14. The dimensions of the cesspools utilized in both examples were approximately 20 x 30 feet and 18 inches deep, thus containing about 900 cubic feet.

After the effluent was introduced into the said shallow pit, approximately 2,400 pounds of an expanded volcanic glass rock having a density of 8 pounds per square foot and the following mesh-size characteristics:

Greater than 16 mesh—35% volume, 35% weight
Between 16 mesh and 20 mesh—25% volume, 25% weight
Between 20 mesh and 30 mesh—14% volume, 14% weight
Between 30 mesh and 50 mesh—12% volume, 12% weight
Between 50 mesh and 100 mesh—8% volume, 8% weight
Less than 100 mesh—6% volume, 6% weight was introduced into the pit to form a blanket approximately 6 inches thick which float in a uniform manner on the top of the effluent.

Upon standing for a considerable number of months, and without subsequent addition of any aggregate, there was no detectable disagreeable odor from said cesspool. Water obtained by pressing the wetted rock taken from the surface of the blanket was tested and found to have a pH of about 7 whereas the effluent at the interface of said layer was found to be of higher alkalinity, indicating the formation of an acid.

Upon agitation whereby any of the effluent below the surface of the blanket layer was exposed, the stench was immediately detected by the observer. The agitation necessary to break up the continuity of the blanket was considerable and direct. Mere natural occurrences such as heavy rain, windstorm, etc., did not affect the continuity of said blanket. Even after vigorous agitation, and within a short time after same ceased, the blanket once again assumed its uniform covering characteristic and the noxious odor ceased to be detectable.

The second example of the method according to the invention involved the dumping of gravel and pebble aggregate over the layer of expanded volcanic glass rock, whereby the top of the pit was made strong enough to support a person walking thereacross. In this case, effluent was run under and dispersed through the interstices of said blanket allowing only for a thin layer of effluent under said blanket. Additional raw effluent was run into the said pool entering from beneath the blanket and aggregate layer. Once again the noxious and most disagreeable odor was not detectable. The only detectable odor was within tolerable limits and could be compared in character to the odor arising from slightly stagnant waters as in a slow moving stream.

While the chemical composition of the volcanic glass rock material utilized herein is not in itself a part of the invention, the composition utilized in the above examples is typified by the following formula:

| | Percent |
|---|---|
| $SiO_2$ | 73 |
| $Al_2O_3$ | 14 |
| $Fe_2O_3$ | 1 |
| $CaO$ | 1 |
| $K_2O$ | 1 |
| $Na_2O$ | 3 |
| Combined water | 4 |

It is believed that the method embodying the principles of the invention has been fully described so as to permit the skilled artisan to practice same. Examples herein described were typical examples applying said method, and it will be recognized that minor changes in proportions, arrangement of steps, and composition of ingredients, and situs of application may be varied without departing from the scope and concept of the invention as embodied in the appended claims.

I claim:

1. The invention comprising means for capping a cesspool or the like whereby the sewage effluent therein may be digested by aeration without exposure of the surroundings to the noxious odors characteristic of such digestion process, said means comprising a floating uniform blanket formed of granules of expanded vitreous rock of volcanic origin, each of said expanded granules having a closed cell structure capable of floating upon and covering the entire surface of said cesspool.

2. The invention as claimed in claim 1 in which said blanket forming granules comprise expanded perlite of a particle size greater than 100 mesh.

3. In a sewage effluent treatment structure including a shallow pit having inlet means for discharging sewage effluent in said pit, and lining means forming the floor of said pit, the invention comprising a floating layer formed of thermally expanded vitreous mineral material of volcanic origin, said layer overlying the top surface of the effluent and abutting the walls of said pit, the material forming said layer comprising granules having a closed cell structure, said layer having a plurality of tortuous passages defined by the interstices between particles, said passages affording a diffusing medium for the odor causing gases rising from the digestive process and a similar diffusing medium for the oxygen of the air, whereby the odor is capable of being abated without interference with the natural digestive processes of said effluent.

4. The invention as claimed in claim 3 in which the outer surface of each granule of material is wettable and affords a maximum surface active area.

5. The method of substantially containing the noxious odors of an open cesspool to materially abate same during the natural digestion processes of the sewage stored therein and comprising the steps of depositing sufficient quantity of the thermally expanded vitreous volcanic material into said cesspool and forming thereby a floating blanket of said material over the full top surface area of said cesspool.

6. The method described in claim 5 in which said material comprises expanded perlite.

7. The method described in claim 5 in which said material is expanded perlite of a particle size detainable by a 100 mesh size screen.

References Cited in the file of this patent

UNITED STATES PATENTS

| 2,795,542 | Horne et al. | June 11, 1957 |
| 2,796,399 | Sanders et al. | June 18, 1957 |
| 2,926,988 | Hurley | Mar. 1, 1960 |

FOREIGN PATENTS

| 13,780 | Australia | Dec. 18, 1928 |